UNITED STATES PATENT OFFICE.

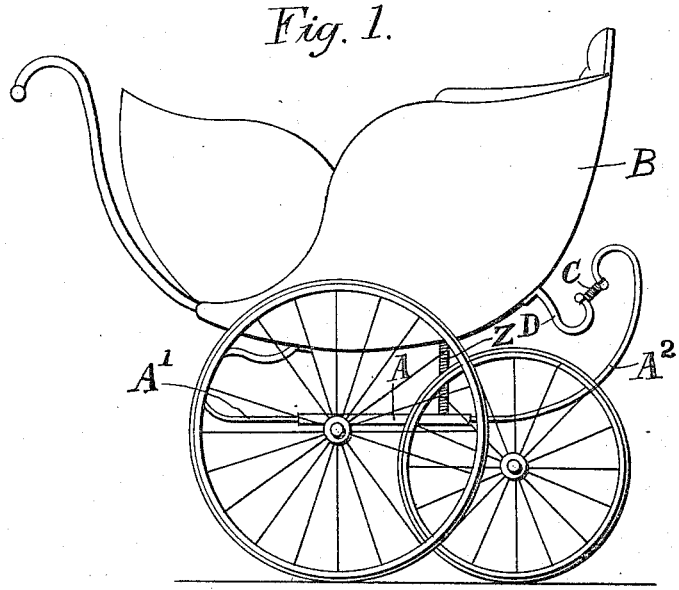
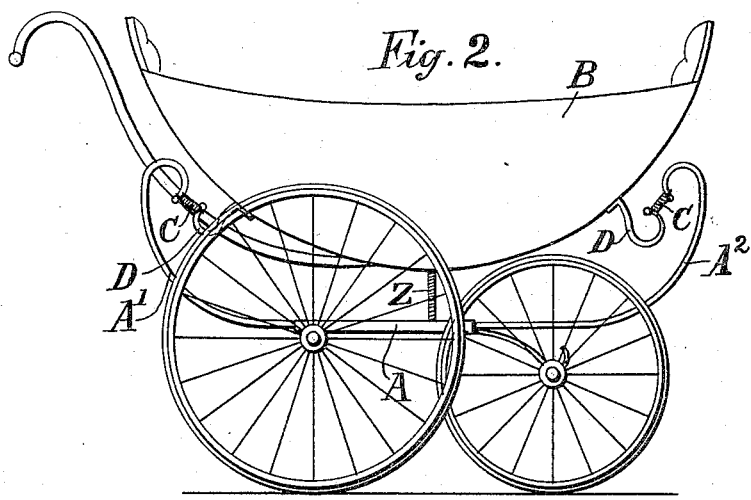

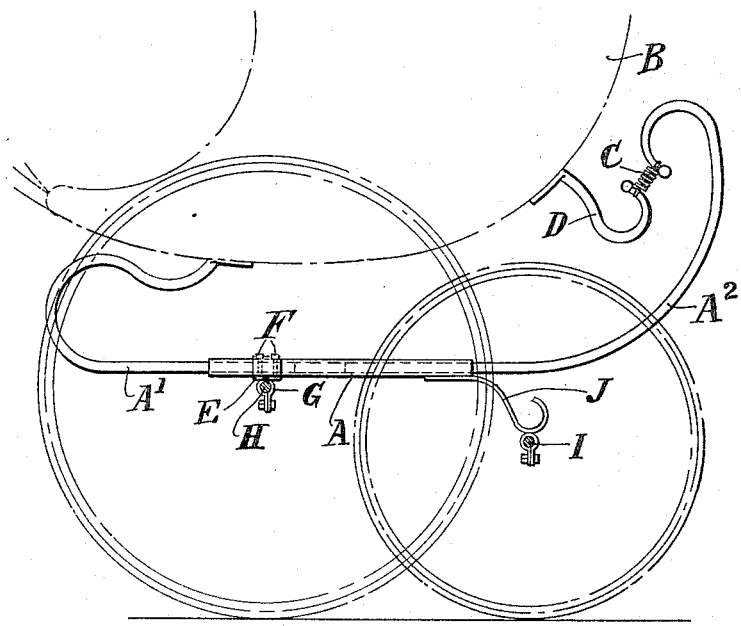

FREDERICK J. McKENZIE, OF LONDON, ENGLAND.

LIGHT ROAD-VEHICLE.

1,168,896.   Specification of Letters Patent.   Patented Jan. 18, 1916.

Application filed February 25, 1914. Serial No. 820,940.

*To all whom it may concern:*

Be it known that I, FREDERICK JAMES MCKENZIE, a subject of the King of Great Britain, residing at 4 Great Portland street, London, England, have invented certain new and useful Improvements in Light Road-Vehicles, of which the following is a specification.

This invention relates to frames for baby carriages, mailcarts, perambulators, bath chairs, invalid carriages or the like.

The present invention has for its object to form the total length of the frames or frame members for perambulators, mailcarts, baby carriages, bath chairs, invalid carriages, or the like (all of which I will hereinafter refer to under the term "carriage") in sections i. e. in suchwise that such frames or frame members are capable of adjustment, or capable of forming frames of various lengths so as to suit various types or sizes of the carriage body; and the journals or bearings (or housings for said journals or bearings) for the axles of the wheels may be so mounted or carried on said frames or frame members that said journals or bearings or the housings thereof are capable of adjustment toward and away from one another so as thus to enable the length of the wheel base to be adjusted (i. e. lengthened or shortened) as may be required.

Referring to the accompanying drawings: Figure 1 is a view in side elevation of a carriage (namely a baby car) provided on each side of the car with a frame or frame member; each of which frames or frame members is constructed, according to the present invention, in three parts telescopically combined to form a frame or frame member of the total length desired; which 3 parts as shown in Fig. 1 have been slid together so as to form a frame member of shortened length on each side i. e. so as to suit a short car body as shown in this figure. Fig. 2 is a view in side elevation of a carriage (namely a baby carriage) the body of which is longer than that shown in Fig. 1 and the telescopic frame or frame member according to this invention (at each side) is shown extended so as to form a longer wheel base and suit this longer form of carriage body. Fig. 3 is a local diagrammatic view in side elevation of my present invention carried into practice with the telescopic frames or frame members so formed or provided with journals or bearings or housings for said journals or bearings for the axle of one of the wheels that said journals or bearings or housings thereof are capable of adjustment with respect to the journals or bearings of the other wheel to thereby enable the length of the wheel base to be adjusted.

Referring to Figs. 1 and 2: According to the construction shown in the drawings each said side frame comprises three principal components or members viz. a central connecting member termed the central member A and two end members $A^1$ and $A^2$ which latter at their inner ends are telescopically combined with (or otherwise adapted to slide in or upon) the central member A with means (such as rivets or bolts not shown) to secure said end members $A^1$ and $A^2$ to said central member A in any desired position to which they are adjusted; while the other end i. e. the outer end of each end member may be curved or formed into any desired shape for example as illustrated and provided with any suitable means for connecting the body thereto or having the body suspended or otherwise attached thereto, for example the central member A may be tubular and the inner end of each end member $A^1$ $A^2$ (which latter may be solid or tubular) adapted to slide telescopically within said tubular central member A and each adapted to be separately fixed at any desired point as for example by providing a series of apertures through the central member A, and through the end members and passing one or more bolts or locking pins through said apertures so as to secure each end member at any desired position relatively to the central member—see for example the arrangement illustrated in Fig. 3. The other end of the two end members $A^1$ $A^2$ may be curved or formed to any desired shape for example somewhat in the form of a spring and from such end the body B of the carriage may be suspended advantageously through the medium of a spiral suspension spring C the other end of each of which is attached to a rigid arm D carried on the body B of the carriage; or said body may be otherwise suitably attached to such end of each said end member. Furthermore, if desired, a tension or other suitable spring or springs Z may be attached at one end to the lower part of the body B of the carriage and at the other end to the central member A for the purpose of preventing any excessive swaying or rocking of the body B. The journals or bearings for both the wheel axles may be carried on the central member A (as illustrated in Figs. 1 and 2) or may be carried on the end members or the journals or bearings for the axle of one wheel may be carried on the end members and for the axle of the other wheel carried on the central member; for example by means of brackets or other suitable housings bolted clipped or otherwise suitably formed or attached on said central member or on end members. As aforesaid the end members $A^1$ $A^2$ may be made either tubular or solid and if desired same may be formed in suchwise as to act as springs.

Referring to the arrangement illustrated in Fig. 3; the end member $A^1$ telescopically combined with the central member A is locked in the desired position with respect to said central member A by means of the sleeve or bracket E and bolts F which latter pass through the two members A $A^1$; a series of holes being provided in the central member A to allow of the adjustment of the sleeve along said member; and this sleeve or bracket E carries the journal or bearings G for one axle H, while the other axle I is carried in a bracket J fixed to the said central member A on each side of the carriage.

By this invention I can therefore adopt a standard size (or more than one size if desired) of such sectional frames whether made in 3 or other number of parts; and such standard size can be adapted and used for forming frames of different lengths to suit different sizes and types of carriages, or the like. Furthermore two such tubular or other side frames (such as made from the three parts A $A^1$ $A^2$) may be connected together in any suitable manner either in the process of manufacture or when it is desired to put same together to form the complete frame in building the carriage; for example the two side frames may be rigidly connected by one or more cross bars which may be either tubular or solid and located at any suitable point or points between the two side frames for instance a single cross bar may be employed and attached at right angles to the central member of each of the two side frames and located midway or thereabouts along the length of said side frames. Or said frames or frame members may be braced or held together by diagonally disposed rods or tubes crossing each other, or otherwise braced or held together; and if desired such cross bars or tubes or brace bars or tubes may be arranged to be attached to and detached from the said frame members in any suitable manner such as screwing thereinto or by screw and nut or clips or other equivalent or suitable arrangement.

Obviously the three parts A. $A^1$. $A^2$., arranged and adapted to slide along one another telescopically or otherwise to form each frame or frame member of the desired length, should be so formed or fitted together as to prevent any turning movement axially of one part relatively to one another; and if the said parts A. $A^1$. $A^2$. are circular in cross section then any relative turning movement between these parts may be prevented by any suitable means as for example as shown in Fig. 3 by the bolts F passing through coincident holes in the two members A. $A^1$, while the parts A. $A^2$. are fixedly secured together by any suitable means such as brazing riveting or clamping; or such members A. $A^1$. $A^2$.—or the parts thereof where same slide upon one another telescopically or otherwise—may be formed of other than circular shape in cross section as for example the parts $A^1$. $A^2$. should be square or rectangular or oval or other suitable shape (other than circular) in cross section and the part A if tubular formed with correspondingly shaped bore or opening therethrough or therein.

What I claim is, for supporting the body of a "carriage" of the kind hereinbefore referred to:—

1. A frame or frame member for each side of a carriage, constructed of a plurality of parts which collectively form the total length of said frame or frame member and which are arranged and adapted to slide telescopically or otherwise along one another to form said frame or frame member, of the desired length to suit any particular length of carriage body or any particular length of wheel base, the end parts of the frame member directly connected to the body of the carriage being shaped to form C-springs on which the said body rests, and means to secure said parts firmly together in any position to which they are adjusted, substantially as described.

2. A frame or frame member for each side of a carriage, constructed of a plurality of parts which collectively form the total length of said frame or frame member and which are arranged and adapted to slide telescopically or otherwise along one another to form said frame or frame member, of the desired length to suit any particular length of carriage body or any particular length of wheel base, the end parts of the frame member directly connected to the body of the carriage being shaped to form C-springs on which the said body rests, means to secure said parts firmly together in any position to which they are adjusted, and journals or bearings (or housings for said journals or bearings) for the axles of the wheels, so mounted on the said parts of said frame or frame member that said journals or bearings (or the housings thereof) are capable of adjustment toward and away from one another, substantially as described.

3. A frame or frame member for each side of a carriage constructed of a plurality of parts which collectively form the total length of said frame or frame member and which are arranged and adapted to slide telescopically or otherwise along one another to form said frame or frame member, of the desired length to suit any particular length of carriage body or any particular length of wheel base, means to secure said parts firmly together in any position to which they are adjusted, and bearings for the wheel axles firmly attached to the central part of said frame, substantially as described.

4. A frame or frame member for each side of a carriage constructed of a plurality of parts which collectively form the total length of said frame or frame member and which are arranged and adapted to slide telescopically or otherwise along one another to form said frame or frame member, of the desired length to suit any particular length of carriage body or any particular length of wheel base, means to secure said parts firmly together in any position to which they are adjusted, bearings for one of the wheel axles fixedly attached to the central part of said frame, and bearings for the other wheel axle adjustably attached to said central part, substantially as described.

In witness whereof I have hereunto set my hand in presence of two witnesses.

FRED. J. McKENZIE.

Witnesses:
EDWIN GANDOR,
HUBERT D. JAMISON.

Copies of this patent may be obtained for five cents each, by addressing the "Commissioner of Patents, Washington, D. C."